(12) United States Patent
Choo

(10) Patent No.: US 6,999,060 B2
(45) Date of Patent: Feb. 14, 2006

(54) LIQUID CRYSTAL DISPLAY AND FABRICATING METHOD THEREOF

(75) Inventor: Kyo Seop Choo, Kumi-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 66 days.

(21) Appl. No.: 10/325,045

(22) Filed: Dec. 18, 2002

(65) Prior Publication Data
US 2003/0117542 A1    Jun. 26, 2003

(30) Foreign Application Priority Data
Dec. 22, 2001 (KR) ................. 2001-83399

(51) Int. Cl.
G02F 1/136 (2006.01)
G02F 1/1343 (2006.01)
G09G 3/36 (2006.01)
H01L 31/20 (2006.01)
H01L 29/15 (2006.01)

(52) U.S. Cl. .................. 345/139; 349/42; 345/92; 345/100; 345/104; 257/59; 257/72

(58) Field of Classification Search ............. 349/43, 349/139, 42; 257/59, 72; 345/92, 100, 104

See application file for complete search history.

(56) References Cited

U.S. PATENT DOCUMENTS

| | | | | |
|---|---|---|---|---|
| 5,003,356 A | * | 3/1991 | Wakai et al. | 257/390 |
| 5,798,744 A | * | 8/1998 | Tanaka et al. | 345/92 |
| 5,946,060 A | * | 8/1999 | Nishiki et al. | 349/48 |
| 5,955,744 A | * | 9/1999 | Gu et al. | 257/59 |
| 5,969,778 A | * | 10/1999 | Oh et al. | 349/43 |
| 6,310,667 B1 | * | 10/2001 | Nakayoshi et al. | 349/42 |
| 6,509,591 B1 | * | 1/2003 | Pang | 257/291 |

FOREIGN PATENT DOCUMENTS

| | | |
|---|---|---|
| JP | 12-196104 | 7/2000 |
| JP | 13-330849 | 11/2001 |

* cited by examiner

Primary Examiner—Robert Kim
Assistant Examiner—Hoan C. Nguyen
(74) Attorney, Agent, or Firm—Brinks Hofer Gilson & Lione

(57) ABSTRACT

Disclosed are a liquid crystal display and a fabricating method thereof enabling to improve an opening ratio of the liquid crystal display by modifying a structure of a thin film transistor. Each pixel of the liquid crystal display includes a gate line formed on a substrate in one direction with a predetermined interval from another one, a data line formed in a direction perpendicular to the gate line so as to define a pixel area, a thin film transistor formed on the gate line at an intersection between the gate and data lines, and a pixel electrode formed in the pixel area.

8 Claims, 3 Drawing Sheets

LIQUID CRYSTAL DISPLAY AND FABRICATING METHOD THEREOF

This application claims the benefit of the Korean Application No. P2001-83399 filed on Dec. 22, 2001, which is hereby incorporated by reference.

BACKGROUND OF THE INVENTION

1. Field of the Invention

The present invention relates to a liquid crystal display, and more particularly, to a liquid crystal display and a fabricating method thereof enabling to improve an opening ratio of the liquid crystal display by modifying a structure of a thin film transistor.

2. Discussion of the Related Art

Generally, a liquid crystal display includes a lower substrate having thin film transistors and pixel electrodes arranged thereon, an upper substrate having color filters for realizing colors and common electrodes, and liquid crystals inserted between the upper and lower substrates. In this case, light transmittance of the liquid crystals varies in accordance whether a voltage is applied thereto or not so as to display an image.

Namely, on the lower substrate are formed a plurality of gate lines arranged in one direction so as to leave a predetermined interval from each other, a plurality of data lines arranged in a direction perpendicular to the gate lines with a predetermined interval from each other so as to define matrix type pixel areas, respectively. A plurality of pixel electrodes are formed in the pixel areas, respectively. And, a plurality of thin film transistors are formed at intersections between the gate and data lines so as to apply data signals of the data lines to the corresponding pixel electrodes in accordance with signals of the gate lines, respectively.

On the upper substrate are formed black matrix layers cutting off light from portions corresponding to the gate lines, data lines, and thin film transistors on the lower substrate, R, G, and B color filter layers at portions corresponding to the pixel areas, respectively, and common electrodes on the color filter layers, respectively.

Since the black matrix layers are formed to cut off light from the portions where the thin film transistors are formed in the general liquid crystal display, an opening ratio is reduced corresponding to the portions where the thin film transistors are formed.

A constitution of a thin film transistor in a liquid crystal display according to a related art is explained as follows.

FIG. 1 illustrates a layout of a thin film transistor in a general liquid crystal display.

Namely, a gate line 1 having a gate electrode 1a is arranged in one direction with a predetermined interval from other gate lines on a substrate(not shown in the drawing), and a gate insulating layer(not shown in the drawing) is formed on an entire surface. A semiconductor layer 3 as an active layer of a thin film transistor is formed like an island on the gate insulating layer over the gate electrode 1a, and a data line 2 having a source electrode 2a is arranged on the gate insulating layer with a predetermined interval in a direction perpendicular to the gate line 1 so as to define a pixel area. In this case, the gate and source electrodes 1a and 2a are formed at the pixel area at an intersection between the gate and data lines 1 and 2, and the source electrodes 2a extends from the data line 2 so as to be overlapped with the semiconductor layer 3.

And, a drain electrode 2b is formed on the semiconductor layer 3 at a side opposite to the source electrode 2a so as to complete a thin film transistor(TFT). Besides, a pixel electrode 4 is formed in the pixel area so as to be connected to the drain electrode 2b.

Unfortunately, the thin film transistor in the general liquid crystal display has the following disadvantages or problems.

First, the thin film transistor is formed at the specific area in the pixel area, thereby reducing an opening ratio of the liquid crystal display.

Second, since the source electrode extends from the data line so as to be overlapped with the gate electrode, the parasitic capacitance formed between the gate and source electrodes, is not uniform for various reasons including misalignment during fabrication which causes flickering of the liquid crystal display.

SUMMARY OF THE INVENTION

Accordingly, the present invention is directed to a liquid crystal display and a fabricating method thereof that substantially obviates one or more problems due to limitations and disadvantages of the related art.

An object of the present invention is to provide a liquid crystal display and a fabricating method thereof enabling to improve an opening ratio of the liquid crystal display by placing a channel region of a thin film transistor on a gate line as well as reduce a parasitic capacitance Cgs between the gate and source electrodes and another parasitic capacitance Cgd between the gate and drain electrodes.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display according to the present invention includes a gate line formed on a substrate in one direction with a predetermined interval from other gate lines, a data line formed in a direction perpendicular to the gate line so as to define a pixel area, a thin film transistor formed on the gate line at an intersection between the gate and data lines, and a pixel electrode formed in the pixel area.

Preferably, the thin film transistor includes a semiconductor layer formed over the gate line at the intersection between the gate and data lines wherein the gate and data lines are used as gate and source electrodes, respectively and a drain electrode formed over the gate line across a portion of the semiconductor layer confronting the data line.

More preferably, the semiconductor layer is further formed under the data line.

More preferably, the pixel electrode extends to be connected to the drain electrode.

Preferably, a portion of the gate line where the thin film transistor is formed is wider than the remaining portion of the gate line.

Preferably, gate and source electrodes of the thin film transistor does not protrude from the gate and data lines, respectively.

In another aspect of the present invention, a method of fabricating a liquid crystal display includes the steps of forming a gate line on a substrate, depositing a gate insulating layer on an entire surface of the substrate having the gate line formed thereon, forming an island-like semiconductor layer on the gate insulating layer over the gate line, and forming a data line on the gate insulating layer in a direction perpendicular to the gate line so as to be overlapped with one side off the semiconductor layer and forming a drain electrode over the gate line so as to be overlapped with the other side of the semiconductor layer.

Preferably, the method further includes the steps of forming a passivation layer on an entire surface of the substrate so as to have a contact hole exposing the drain electrode and forming a pixel electrode in the pixel area so as to be connected to the drain electrode through the contact hole.

Preferably, a gate electrode of a thin film transistor failing to protrude from the gate line is not formed in addition and a portion of the gate line where the thin film transistor is formed is formed wider than the remaining portion of the gate line.

Preferably, the semiconductor layer is formed over the gate line where a thin film transistor will be formed as well as on the gate insulating layer where the data line is formed.

Preferably, a source electrode of a thin film transistor does not protrude from the data line.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
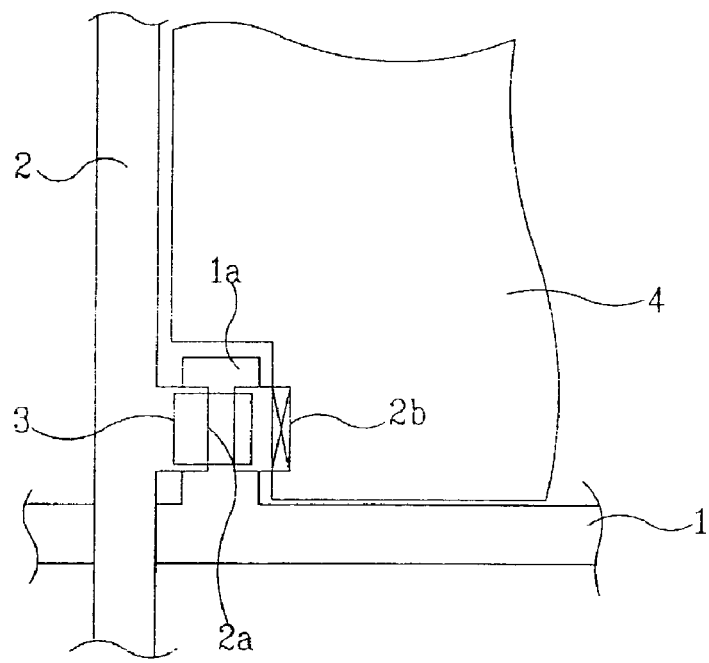
FIG. 1 illustrates a layout of a thin film transistor in a general liquid crystal display.
Figure 2:
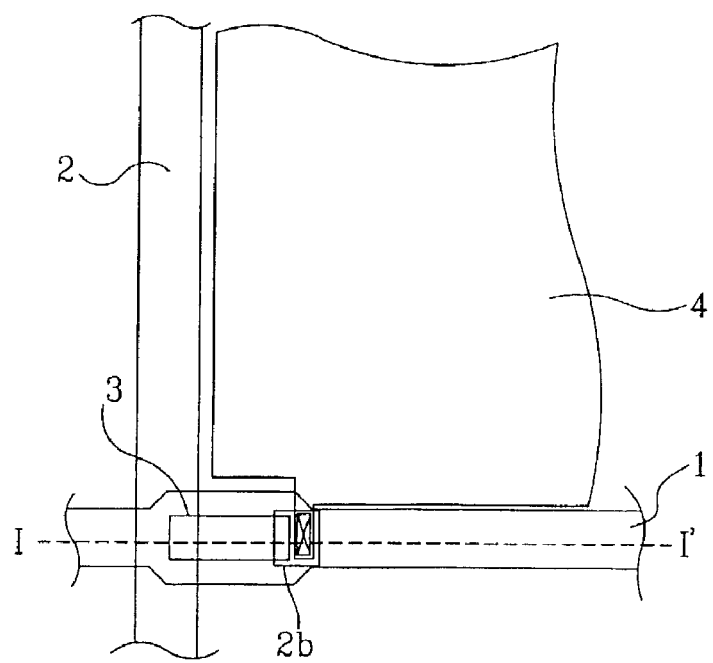
FIG. 2 illustrates a layout of a thin film transistor in a liquid crystal display according to a first embodiment of the present invention.
Figure 3:
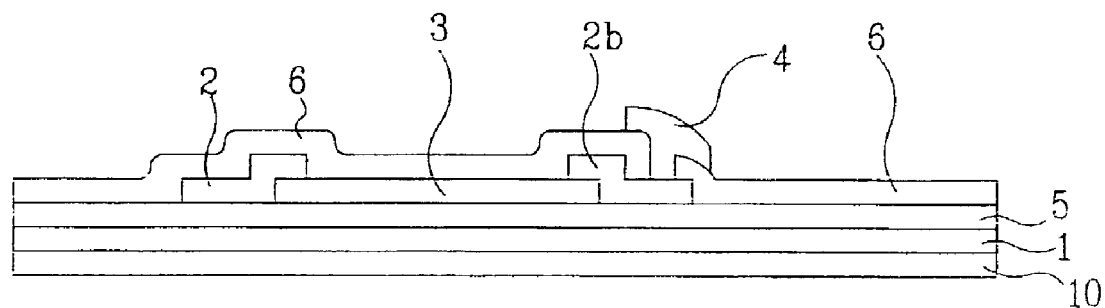
FIG. 3 illustrates a cross-sectional view of a thin film transistor in a liquid crystal display according to a first embodiment of the present invention along a cutting line I–I' in FIG. 2.
Figure 4:
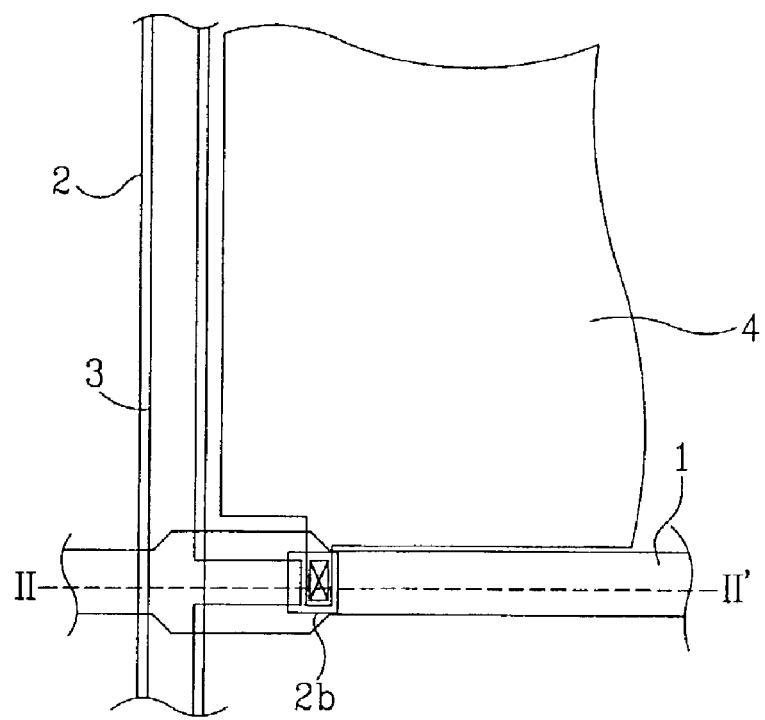
FIG. 4 illustrates a layout of a thin film transistor in a liquid crystal display according to a second embodiment of the present invention.
Figure 5:
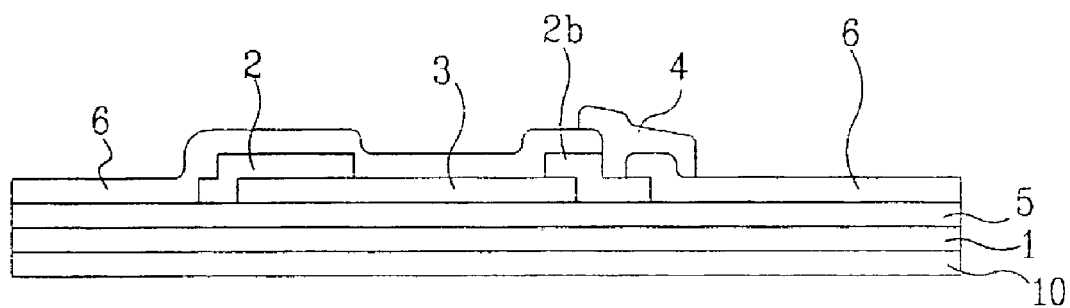
FIG. 5 illustrates a cross-sectional view of a thin film transistor in a liquid crystal display according to a second embodiment of the present invention along a cutting line II–II' in FIG. 4.

FIG. 2 illustrates a layout of a thin film transistor in a liquid crystal display according to a first embodiment of the present invention and FIG. 3 illustrates a cross-sectional view of a thin film transistor in a liquid crystal display according to a first embodiment of the present invention along a cutting line I–I' in FIG. 2. Moreover, FIG. 4 illustrates a layout of a thin film transistor in a liquid crystal display according to a second embodiment of the present invention and FIG. 5 illustrates a cross-sectional view of a thin film transistor in a liquid crystal display according to a second embodiment of the present invention along a cutting line II–II' in FIG. 4.

Referring to FIG. 2 and FIG. 3, a thin film transistor in a liquid crystal display according to a first embodiment of the present invention has a gate line 1 formed in one direction on a glass substrate 10. The gate lines are separated by predetermined intervals from another one. A gate insulating layer 5 is formed on an entire surface of the substrate including the gate line 1, and a semiconductor layer 3 as an active layer of the thin film transistor is formed like an island on the gate insulating layer 5 over a predetermined area (an area where the thin film transistor will be formed) of the gate line 1.

A data line 2 is formed on the gate insulating layer 5 in a direction perpendicular to the gate line 1 so as to be overlapped with one side portion of the semiconductor layer 3 toward a direction of the gate line 1. And, a drain electrode 2b is formed across the other side portion of the semiconductor layer 3 confronting the data line 2 and the gate insulating layer 5.

A passivation layer 6 having a contact hole for the drain electrode 2b is formed on an entire surface of the substrate 10 including the data line 2 and drain electrode 2b. And, a pixel electrode 4 is formed in the pixel area so as to be electrically connected to the drain electrode 2b through the contact hole.

As it can be seen from FIG. 2, the thin film transistor in the liquid crystal display according to the present invention has a source electrode that does not extend from the data line 2 and a gate electrode that does not extend from the gate line 1. However, while the area used to form the electrodes and transistor is substantially reduced, a portion of the gate line 1 on the area where the thin film transistor will be formed becomes wider than the rest portion of the gate line 1. This is to say that the opening ratio may be further increased by judicious design.

Referring to FIG. 4 and FIG. 5, a thin film transistor in a liquid crystal display according to a second embodiment of the present invention has a gate line 1 formed in one direction on a glass substrate 10 (with predetermined intervals separating gate lines). A gate insulating layer 5 is formed on an entire surface of the substrate including the gate line 1, and a semiconductor layer 3 is formed over a predetermined area(the area where the thin film transistor will be formed) of the gate line 1 and on the gate insulating layer 5 where a data line will be formed. However, unlike the previous embodiment, in the embodiment shown in FIGS. 4 and 5, the semiconductor layer 3 is formed perpendicular to the gate line 1 and only a portion extends parallel to the gate line 1.

A data line 2 is formed on the semiconductor layer 3 in a direction perpendicular to the gate line 1. And, a drain electrode 2b is formed across the other side portion of the semiconductor layer 3 confronting the data line 2 and the gate insulating layer 5.

A passivation layer 6 having a contact hole on the drain electrode 2b is formed on an entire surface of the substrate 10 including the data line 2 and drain electrode 2b. And, a pixel electrode 4 is formed in the pixel area so as to be electrically connected to the drain electrode 2b through the contact hole.

As it can be seen from FIG. 4, the data line 2 is formed wider than the semiconductor layer 3. And, the thin film transistor in the liquid crystal display according to the present invention has a source electrode that does not extend from the data line 2 and a gate electrode that does not extend from the gate line 1. In this embodiment however, while the opening ratio is increased, a portion of the gate line 1 on the area where the thin film transistor will be formed becomes wider than the remaining portion of the gate line 1. Besides, the semiconductor layer 3 formed under the data line 2 is built in one body with the semiconductor layer 3 formed at the area where the thin film transistor will be formed.

A method of fabricating the above-constituted thin film transistor in a liquid crystal display according to the present invention is explained as follows.

First of all, a metal or conductive semiconductor layer is deposited on a substrate 10, and then removed selectively so as to form a gate line 1. In this case, the gates and electrodes does not protrude from the gate line 1 corresponding to an area where a thin film transistor will be formed while the gate line 1 is formed to have a portion wider than the remain portion of the gate line 1.

A gate insulating layer 5 is deposited on an entire surface of the substrate 10 having the gate line 1 formed thereon, and a semiconductor layer 3 is deposited on the gate insulating layer 5, and then the semiconductor layer 3 is selectively removed so as to form an active area of the thin film transistor. In this case, the first embodiment of the present invention removes the semiconductor layer 3 such that only an island-like portion of the semiconductor layer 3 remains over the gate line 1 on the area where the thin film transistor will be formed. And, the second embodiment of the present invention removes the semiconductor layer 3 such that a portion of the semiconductor layer 3 remains over the gate line 1 on the area where the thin film transistor will be formed as well as on the gate insulating layer 5 of the portion where the data line 2 will be formed.

A metal layer is deposited on an entire surface of the substrate, and then patterned to form a data line 2 and a drain electrode 2b. In this case, the data line 2 has no protruding source electrode and is formed to be wider than the semiconductor layer 3. And, the drain electrode 2b is not formed in the pixel area but over the gate line 1.

Subsequently, a passivation layer 6 is deposited on an entire surface of the substrate. A contact hole is then formed in the passivation layer 6. A transparent electrode (ITO) is deposited on an entire surface so as to be connected to the drain electrode 2b through the contact hole, and then patterned to remain in the pixel area only so as to form a pixel electrode 4.

Accordingly, the liquid crystal display and fabricating method thereof according to the present invention have the following advantages or effects as follows.

First, the thin film transistor is not formed in the pixel area but on the gate line at the intersection between the gate and data lines, thereby maximizing the opening ratio of the liquid crystal display.

Second, the gate and source electrodes do not protrude from the gate and data lines, respectively, thereby eliminating the fluctuations of the parasitic capacitances between the gate and source electrodes and between the gate and drain electrodes of the thin film transistor. Therefore, the present invention decreases flickering of the display.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A liquid crystal display comprising:
   a gate line formed on a substrate in a first direction;
   a data line formed in a second direction defining a pixel area with the gate line;
   a thin film transistor formed on the gate line at an intersection between the gate and data lines, the thin film transistor containing a semiconductor layer formed over the gate line at the intersection between the gate and data lines, the semiconductor layer extending from the intersection along the first direction and completely overlapped by the gate line; and
   a pixel electrode formed in the pixel area, wherein the gate line has one or more extensions in an area that overlaps the semiconductor layer such that the extensions are present on opposite sides of the gate line if more than one extension is present, and a width of each extension is substantially smaller than a width of the gate line in which no extension is present.

2. The liquid crystal display of claim 1, wherein the thin film transistor further comprises a drain electrode completely overlapped by the gate line.

3. The liquid crystal display of claim 2, wherein a connection point between the pixel electrode and the drain electrode is completely overlapped by the gate line.

4. The liquid crystal display of claim 2, wherein the thin film transistor further comprises a source electrode completely overlapped by the data line.

5. The liquid crystal display of claim 1, wherein the thin film transistor further comprises a source electrode completely overlapped by the data line.

6. The liquid crystal display of claim 1, wherein the gate line has symmetrical extensions in an area that overlaps the semiconductor layer.

7. The liquid crystal display of claim 6, wherein the extensions terminate at the intersection of the gate and data lines.

8. The liquid crystal display of claim 1, wherein at least one of the extensions terminates at the intersection of the gate and data lines.

* * * * *